US008330766B1

(12) United States Patent
McAllister et al.

(10) Patent No.: US 8,330,766 B1
(45) Date of Patent: Dec. 11, 2012

(54) ZERO-BANDWIDTH CLEARS

(75) Inventors: David Kirk McAllister, Holladay, UT (US); Steven E. Molnar, Chapel Hill, NC (US); Jerome F. Duluk, Jr., Palo Alto, CA (US); Emmett M. Kilgariff, San Jose, CA (US); Patrick R. Brown, Raleigh, NC (US); Christian Johannes Amsinck, Durham, NC (US); James Michael O'Connor, Austin, TX (US); John Matthew Burgess, Austin, TX (US); Gregory Alan Muthler, Austin, TX (US); James Robertson, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1026 days.

(21) Appl. No.: 12/340,496

(22) Filed: Dec. 19, 2008

(51) Int. Cl.
*G09G 5/36* (2006.01)
*G06T 15/40* (2006.01)

(52) U.S. Cl. ......................... 345/547; 345/549; 345/422

(58) Field of Classification Search .................. 345/530, 345/534, 546, 547, 549, 556, 562, 422
See application file for complete search history.

(56) References Cited

U.S. PATENT DOCUMENTS 5,109,520 A 4/1992 Knierim
5,394,170 A 2/1995 Akeley et al.
5,408,606 A 4/1995 Eckart
5,452,299 A 9/1995 Thessin et al.
5,485,586 A 1/1996 Brash et al.
5,500,939 A 3/1996 Kurihara
5,572,655 A 11/1996 Tuljapurkar et al.
5,623,688 A 4/1997 Ikeda et al.
5,625,778 A 4/1997 Childers et al.
5,664,162 A 9/1997 Dye
5,696,945 A 12/1997 Seiler et al.
5,781,201 A 7/1998 McCormack et al.
5,805,868 A 9/1998 Murphy
5,898,895 A 4/1999 Williams
5,905,877 A 5/1999 Guthrie et al.
5,923,826 A 7/1999 Grzenda et al.
6,104,417 A 8/2000 Nielson et al.
6,115,323 A 9/2000 Hashimoto
6,157,963 A 12/2000 Courtright et al.
6,157,989 A 12/2000 Collins et al.
6,172,670 B1 1/2001 Oka et al.
6,202,101 B1 3/2001 Chin et al.
6,205,524 B1 3/2001 Ng
6,219,725 B1 4/2001 Diehl et al.
6,384,822 B1 5/2002 Bilodeau et al.

(Continued)

OTHER PUBLICATIONS

Kilgard, Mark J., "Improving Shadows and Reflections via the Stencil Buffer," (available at www.physics.utah.edu/.about.zona/cs6610/stencil.pdf), Aug. 9, 2003.

(Continued)

*Primary Examiner* — Hau Nguyen
(74) *Attorney, Agent, or Firm* — Patterson & Sheridan, LLP

(57) ABSTRACT

A system and method for performing zero-bandwidth-clears reduces external memory accesses by a graphics processor when performing clears and subsequent read operations. A set of clear values is stored in the graphics processor. Each region of a color or z buffer may be configured using a zero-bandwidth-clear command to reference a clear value without writing the external memory. The clear value is provided to a requestor without accessing the external memory when a read access is performed.

20 Claims, 16 Drawing Sheets

U.S. PATENT DOCUMENTS

| | | | | |
|---|---|---|---|---|
| 6,469,703 | B1 | 10/2002 | Aleksic et al. | |
| 6,545,684 | B1 | 4/2003 | Dragony et al. | |
| 6,570,571 | B1 | 5/2003 | Morozumi | |
| 6,580,427 | B1 | 6/2003 | Orenstein et al. | |
| 6,674,430 | B1 | 1/2004 | Kaufman et al. | |
| 6,778,189 | B1 | 8/2004 | Kilgard | |
| 6,853,382 | B1 | 2/2005 | Van Dyke et al. | |
| 6,864,895 | B1 * | 3/2005 | Tidwell et al. | 345/522 |
| 7,050,069 | B2 | 5/2006 | Selig et al. | |
| 7,129,941 | B2 | 10/2006 | Deering et al. | |
| 7,324,115 | B2 * | 1/2008 | Fraser | 345/553 |
| 2003/0067467 | A1 | 4/2003 | Wilt et al. | |
| 2003/0095127 | A1 | 5/2003 | Blais | |
| 2004/0189652 | A1 | 9/2004 | Emberling | |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

Storm, et al. "Floating-Point Buffer Compression in a Unified Codec Architecture", The Eurographics Association (2008). 10 pages.

* cited by examiner

CONCEPTUAL DIAGRAM

ZERO-BANDWIDTH CLEARS

BACKGROUND OF THE INVENTION

1. Field of the Invention

The present invention generally relates to clearing graphics data buffers, and more specifically to storing clear values and referencing the clear values for portions of graphics data buffers.

2. Description of the Related Art

The performance of conventional graphics processing systems is sometimes limited by the bandwidth that is available between a graphics processor and external memory storing graphics data, such as color and z values. At various times during rendering, the color and z values are cleared to predetermined values. Accordingly, what is needed in the art is an improved system and method for performing clear operations while minimizing read and write accesses of the external memory storing the graphics data.

SUMMARY OF THE INVENTION

A system and method for performing zero-bandwidth-clears reduces external memory accesses by a graphics processor for read and write operations. A set of clear values are stored in the graphics processor. Each region of a color or z buffer (depth and/or stencil) may be configured using a zero-bandwidth-clear command to reference a clear value without writing the external memory. The clear value is provided to a requestor without accessing the external memory when a read access is performed. In addition to reducing accesses of the external memory, cache storage within the graphics processor is conserved since writes to and reads of cleared regions do not access the cache storage.

Another benefit of zero-bandwidth-clears is that one or more regions are cleared in fewer clock cycles compared with writing data to the regions. A rasterizer recognizes the fully-covered regions and generates the zero-bandwidth-clear commands, minimizing the number of clock cycles that are consumed to clear the regions. This may result in improved rendering performance since more clock cycles are available to process other graphics data.

Various embodiments of a method of the invention for performing data clear operations include receiving a clear command including a first clear value for a first tile set within a tile group and determining that a first stored clear value for the tile group is not referenced by any tiles within the tile group. The first clear value is stored as the first stored clear value for the tile group and state information for tiles in the first tile set is updated to reference the first stored clear value, indicating that the tiles in the first tile set are zero-bandwidth cleared to the first stored clear value.

Various embodiments of the invention include a system for performing data clear operations. The system includes a first register, tile group state, and a tile clear unit that is coupled to the first register and the tile group state. The first register is configured to store a first clear value for a tile group including multiple tile sets. The tile group state is configured to store tile state information for each tile in the tile group, the tile state information indicating whether or not each tile is zero-bandwidth-cleared. The tile clear unit is configured to receive a clear command including a clear value for a fully covered tile set, retain the first clear value in the first register when the clear value matches the first clear value, and update the tile group state for tiles in the tile set to indicate that the tiles are zero-bandwidth-cleared to the first clear value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
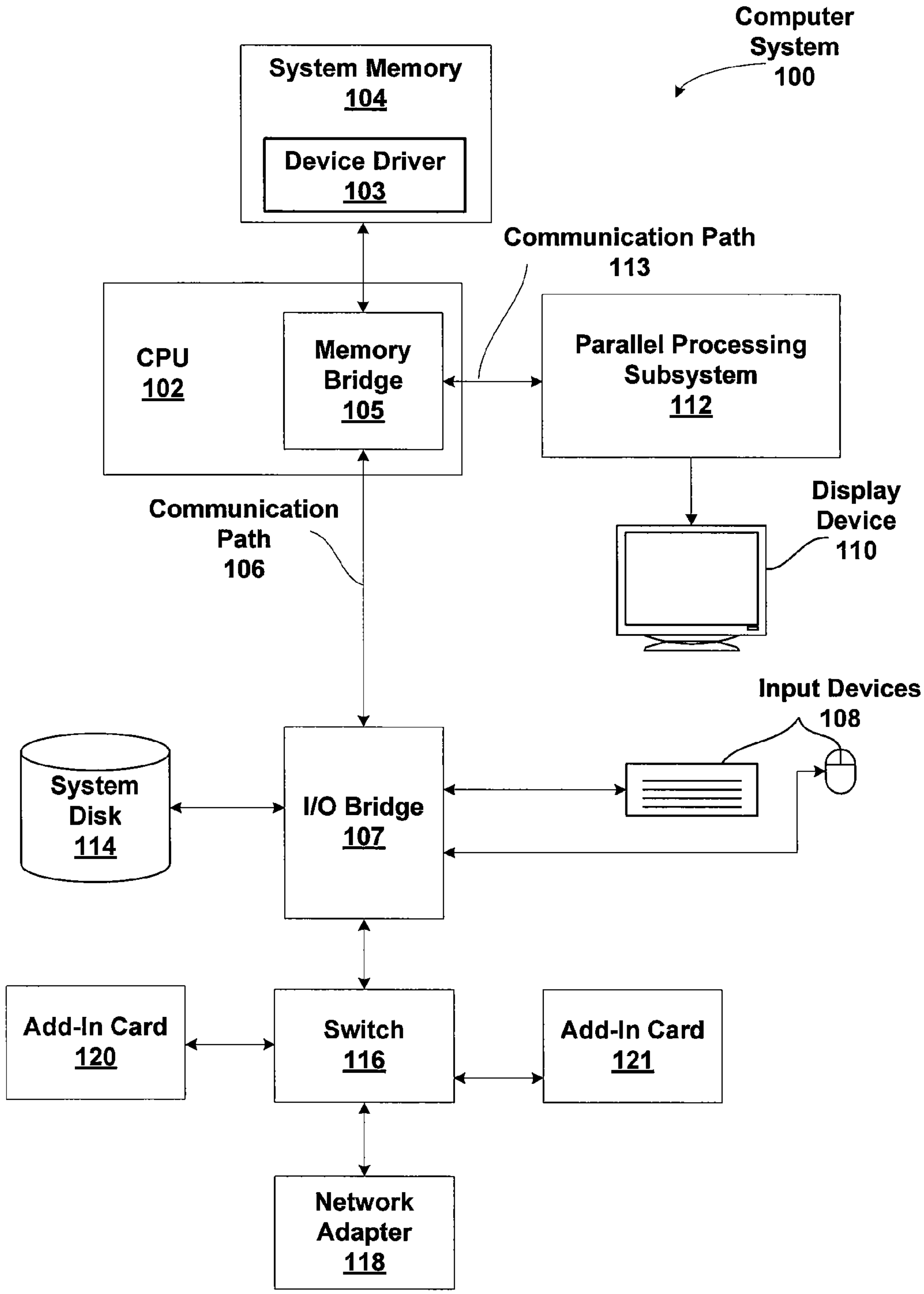
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path through a memory bridge 105. Memory bridge 105 may be integrated into CPU 102 as shown in FIG. 1. Alternatively, memory bridge 105, may be a conventional device, e.g., a Northbridge chip, that is connected via a bus to CPU 102. Memory bridge 105 is connected via communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, one or more of CPU 102, I/O bridge 107, parallel processing subsystem 112, and memory bridge 105 are integrated into one or more chips. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
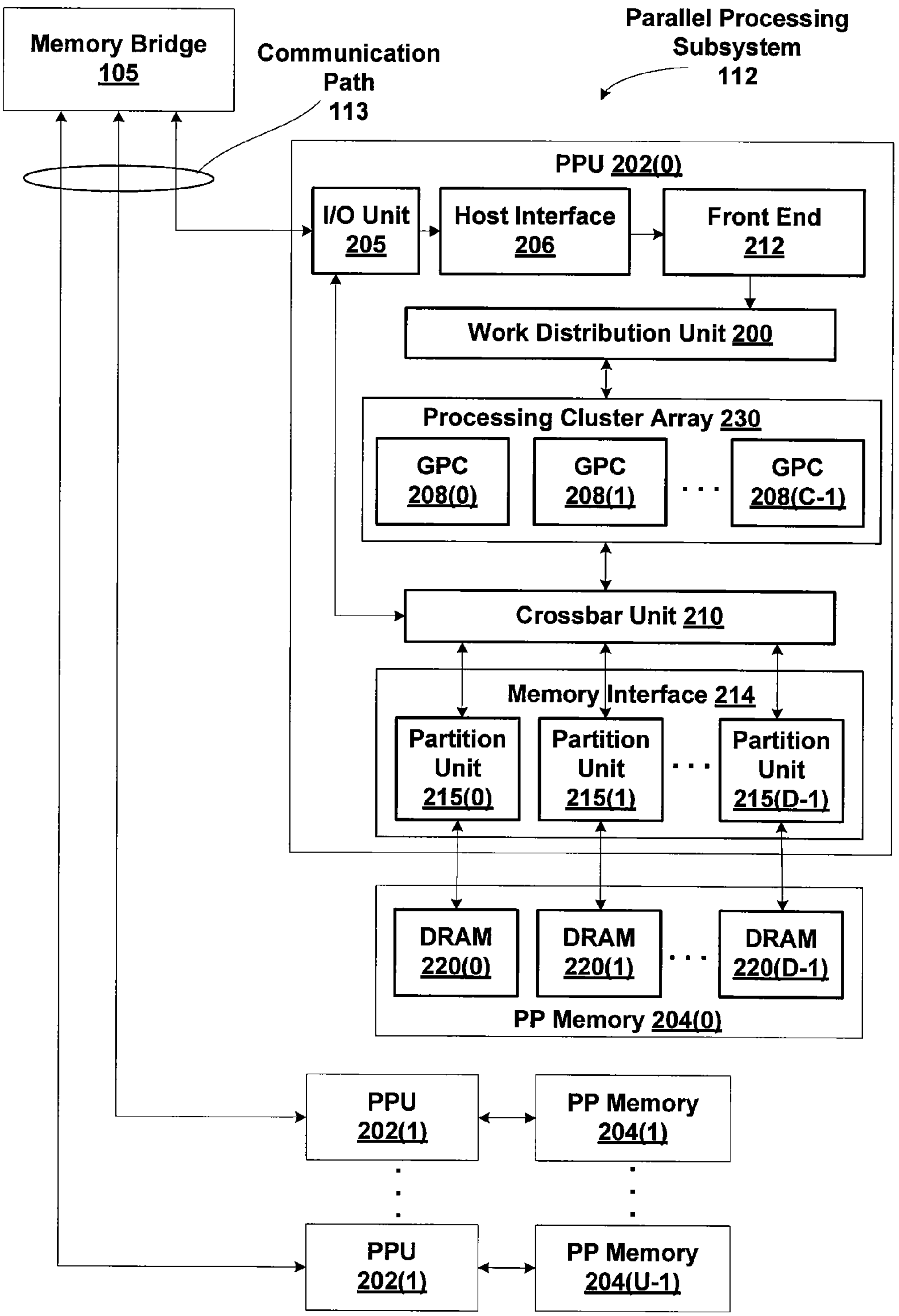
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where $U \geqq 1$. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a command buffer (not explicitly shown in either FIG. 1 or FIG. 2) that may be located in system memory 104, parallel processing memory 204, or another storage location accessible to both CPU 102 and PPU 202. PPU 202 reads the command stream from the command buffer and then executes commands asynchronously relative to the operation of CPU 102. CPU 102 may also create data buffers, which PPUs 202 may read in response to commands in the command buffer. Each command and data buffer may be read by multiple PPUs 202.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each command buffer and outputs the work specified by the command buffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation. Alternatively, all GPCs 208 may be allocated to perform processing tasks using a time-slice scheme to switch between different processing tasks.

GPCs 208 receive processing tasks to be executed via a work distribution unit 200, which receives commands defining processing tasks from front end unit 212. Processing tasks include pointers to data to be processed, e.g., surface (patch) data, primitive data, vertex data, and/or pixel data, as well as state parameters and commands defining how the data is to be processed (e.g., what program is to be executed). Work distribution unit 200 may be configured to fetch the pointers corresponding to the tasks, work distribution unit 200 may receive the pointers from front end 212, or work distribution unit 200 may receive the data directly. In some embodiments of the present invention, indices specify the location of the data in an array. Front end 212 ensures that GPCs 208 are configured to a valid state before the processing specified by the command buffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to output tasks at a frequency capable of providing tasks to multiple GPCs 208 for processing. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. The ability to allocate portions of GPCs 208 for performing different types of processing efficiently accommodates any expansion and contraction of data produced by the different types of processing. Intermediate data produced by GPCs 208 may buffered to allow the intermediate data to be transmitted between GPCs 208 with minimal stalling when a rate at which data is accepted by a downstream GPC 208 lags the rate at which data is produced by an upstream GPC 208.

Memory interface 214 may be partitioned into a number D of memory partition units that are each directly coupled to a portion of parallel processing memory 204, where D≧1. Each portion of memory generally consists of one or more memory devices (e.g DRAM 220). Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
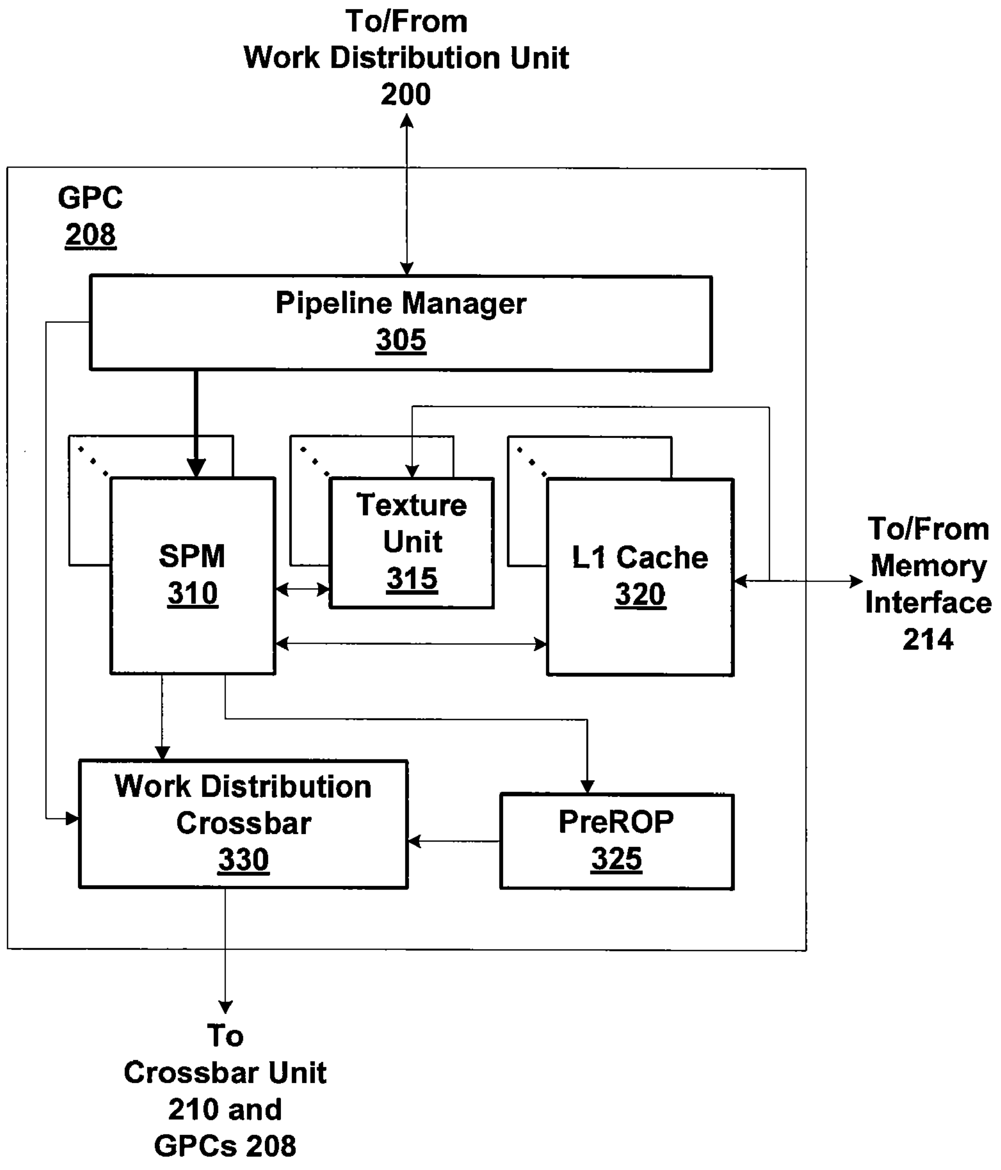
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine for performing screen space graphics processing functions that may include, but are not limited to primitive setup, rasterization, and z culling. The primitive engine receives a processing task from work distribution unit 200, and when the processing task does not require the operations performed by primitive engine, the processing task is passed through the primitive engine to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where $M \geqq 1$, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "thread group." As used herein, a "thread group" refers to a group of threads concurrently executing the same program on different input data, with each thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over multiple clock cycles. Since each SPM 310 can support up to G thread groups concurrently, it follows that up to $G \times M$ thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA"). The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

An exclusive local address space is available to each thread and a shared per-CTA address space is used to pass data between threads within a CTA. Data stored in the per-thread local address space and per-CTA address space is stored in L1 cache 320 and an eviction policy may be used to favor keeping the data in L1 cache 320. Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. An L2 cache may be used to store data that is written to and read from global memory. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read via memory interface 214 and is fetched from an L2 cache, parallel processing memory 204, or system memory 104, as needed. Texture unit 315 may be configured to store the texture data in an internal cache. In some embodiments, texture unit 315 is coupled to L1 cache 320 and texture data is stored in L1 cache 320. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
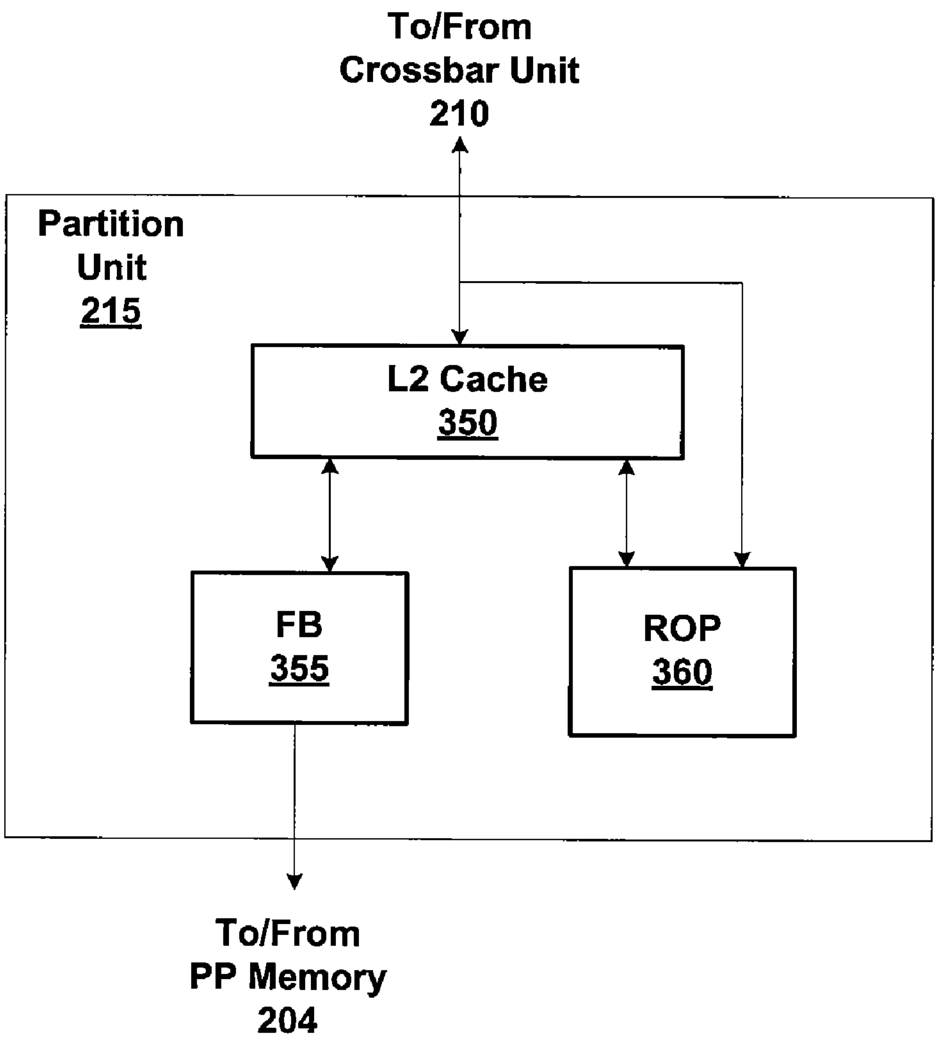
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB 355 for processing. Dirty updates are also sent to FB 355 for opportunistic processing. FB 355 interfaces directly with parallel processing memory 204, outputting read and write requests and receiving data read from parallel processing memory 204.

In graphics applications, ROP 360 is a processing unit that performs raster operations, such as stencil, z test, blending, and the like, and outputs pixel data as processed graphics data for storage in graphics memory. ROP 360 receives render and zero-bandwidth clear commands from crossbar unit 210. In some embodiments of the present invention, ROP 360 is included within each GPC 208 instead of each partition unit 215, and pixel reads and writes are transmitted over crossbar unit 210 instead of pixel fragments.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Graphics Pipeline Architecture

Figure 4:
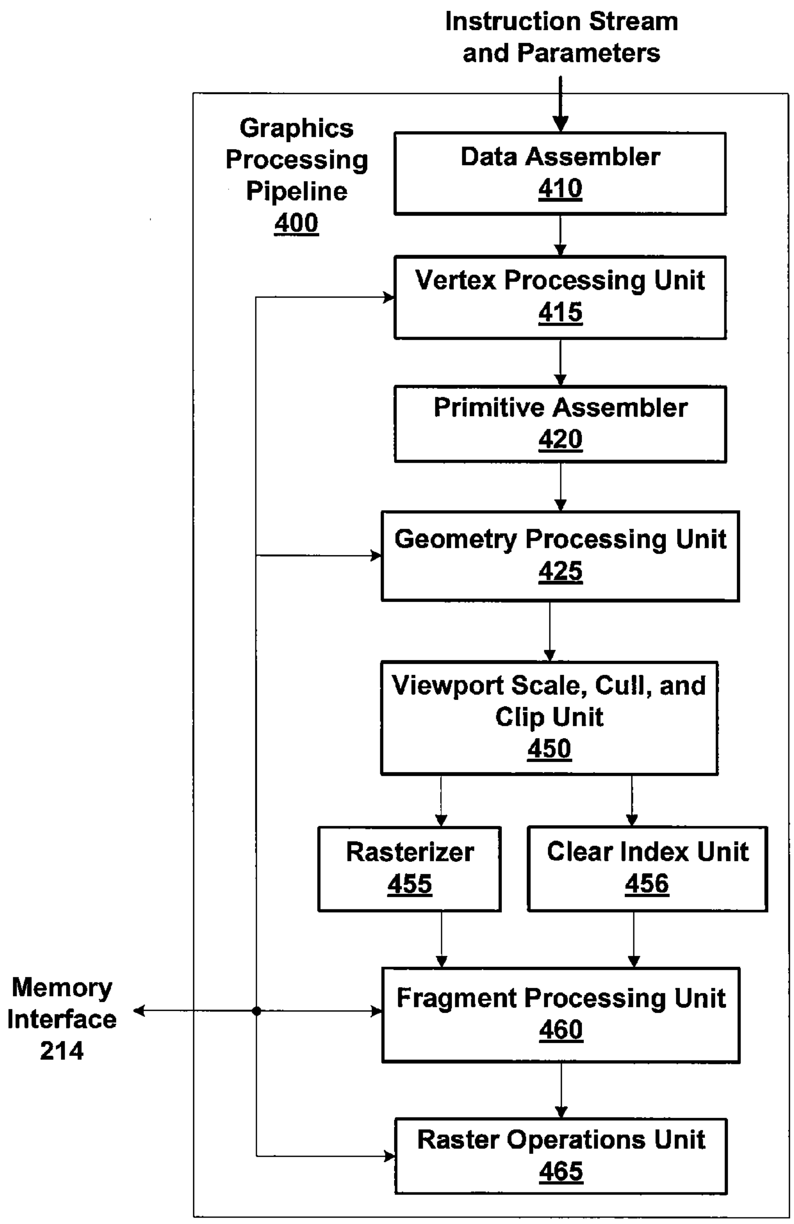
FIG. 4 is a conceptual diagram of a graphics processing pipeline that one or more of the PPUs of FIG. 2 can be configured to implement, according to one embodiment of the present invention.

FIG. 4 is a conceptual diagram of a graphics processing pipeline 400, that one or more of the PPUs 202 of FIG. 2 can be configured to implement, according to one embodiment of the present invention. For example, one of the SPMs 310 may be configured to perform the functions of one or more of a vertex processing unit 415, a geometry processing unit 425, and a fragment processing unit 460. The functions of data assembler 410, primitive assembler 420, rasterizer 455, and raster operations unit 465 may also be performed by other processing engines within a GPC 208 and a corresponding partition unit 215. Alternately, graphics processing pipeline 400 may be implemented using dedicated processing units for one or more functions.

Data assembler 410 processing unit collects vertex data for high-order surfaces, primitives, and the like, and outputs the vertex data, including the vertex attributes, to vertex processing unit 415. Vertex processing unit 415 is a programmable execution unit that is configured to execute vertex shader programs, lighting and transforming vertex data as specified by the vertex shader programs. For example, vertex processing unit 415 may be programmed to transform the vertex data from an object-based coordinate representation (object space) to an alternatively based coordinate system such as world space or normalized device coordinates (NDC) space. Vertex processing unit 415 may read data that is stored in L1 cache 320, parallel processing memory 204, or system memory 104 by data assembler 410 for use in processing the vertex data.

Primitive assembler 420 receives vertex attributes from vertex processing unit 415, reading stored vertex attributes, as needed, and constructs graphics primitives for processing by geometry processing unit 425. Graphics primitives include triangles, line segments, points, and the like. Geometry processing unit 425 is a programmable execution unit that is configured to execute geometry shader programs, transforming graphics primitives received from primitive assembler 420 as specified by the geometry shader programs. For example, geometry processing unit 425 may be programmed to subdivide the graphics primitives into one or more new graphics primitives and calculate parameters, such as plane equation coefficients, that are used to rasterize the new graphics primitives.

In some embodiments, geometry processing unit 425 may also add or delete elements in the geometry stream. Geometry processing unit 425 outputs the parameters and vertices specifying new graphics primitives to a viewport scale, cull, and clip unit 450. Geometry processing unit 425 may read data that is stored in parallel processing memory 204 or system memory 104 for use in processing the geometry data. Viewport scale, cull, and clip unit 450 performs clipping, culling, and viewport scaling and outputs processed graphics primitives to a rasterizer 455 and a clear index unit 456.

Rasterizer 455 scan converts the new graphics primitives and outputs fragments and coverage data to fragment processing unit 460. Additionally, rasterizer 455 may be configured to perform z culling and other z-based optimizations. Clear index unit 456 maintains a table that stores clear values for portions of buffers and generates indexed clear commands as described in conjunction with FIGS. 5A, 5B, 5C, and 6A.

Fragment processing unit 460 is a programmable execution unit that is configured to execute fragment shader programs, transforming fragments received from rasterizer 455, as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in parallel processing memory 204 or system memory 104 for use in processing the fragment data. Fragments may be shaded at pixel, sample, or other granularity, depending on the programmed sampling rate.

Raster operations unit 465 is a processing unit that performs raster operations, such as stencil, z test, blending, and the like, and outputs pixel data as processed graphics data for storage in graphics memory. The processed graphics data may be stored in graphics memory, e.g., parallel processing memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Index-Based Zero-Bandwidth-Clear Operations

Zero-bandwidth-clear operations are used to indicate that locations in a buffer that is stored in external memory, e.g., PP memory 204, "store" a clear value without accessing the external memory. Instead of actually writing the buffer with the clear value, state information is updated to indicate that locations in the buffer are zero-bandwidth cleared. A clear value command provides a clear value that is used by subsequent clear commands to clear a portion of a buffer. Clear commands are used to write the clear value to the portion of the buffer. When zero-bandwidth-clear operations are enabled, the clear commands may be executed without writing external memory and read requests may be executed without reading external memory. Zero-bandwidth-clear operations may be used to clear portions of buffers storing color, z, stencil, surface normals, distances from a light source to a surface, or any other type of data.

When zero-bandwidth-clears are used a set of clear values are stored in a clear values table in each PPU 202, so that portions of the color and z buffers may be cleared to different values. Tiles (two dimensional portions) of color or z buffers may be configured, when zero-bandwidth-clears are enabled, to reference a clear value stored in the clear values table without writing external memory, e.g., PP memory 204 or system memory 104, or internal memory, e.g., L2 cache 350, when clear commands are received. The effective hit rate of L2 cache 350 (and other internal memories) is increased since zero buffer cleared data does not occupy space in L2 cache 350. The clear value referenced by a tile is read from the clear values table when a read request is executed. Different clear values may be determined for each software application and loaded into the clear values table by device driver 103. Alternately, the clear values table may be automatically loaded with clear values by PPU 202 as the clear values are received with each clear value command.

Figure 5A:
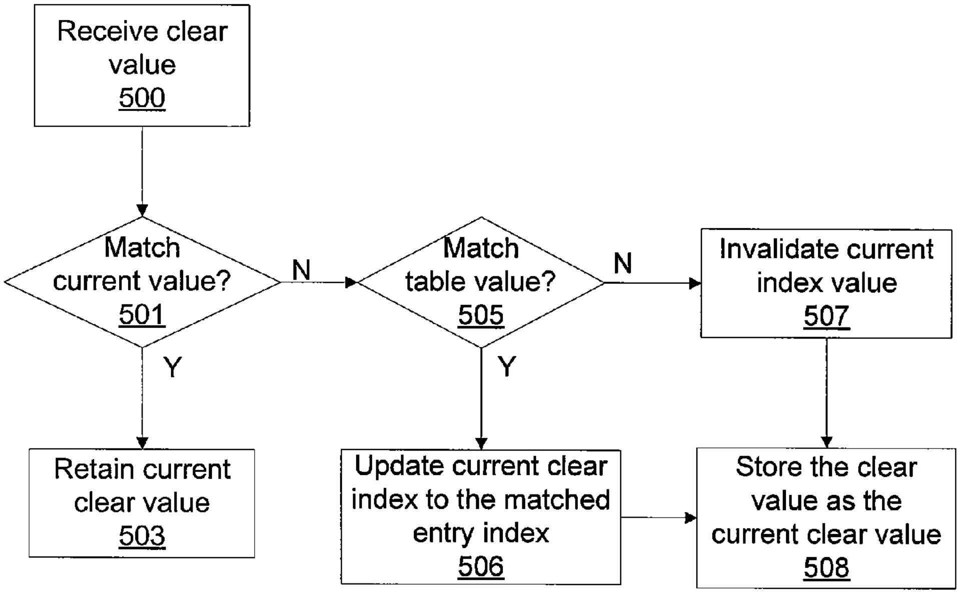
FIG. 5A is a flow diagram of method steps for updating an index for index-based zero-bandwidth-clear operations, according to one embodiment of the present invention.

FIG. 5A is a flow diagram of method steps for updating an index for index-based zero-bandwidth-clear operations, according to one embodiment of the present invention. An index corresponding to an entry in the clear values table is determined by clear index unit 456. Clear index unit 456 includes a copy of the clear values table. A different clear values table or a separate portion of a single clear values table may be used to store z clear values apart from color clear values. In step 500 clear index unit 456 receives a clear value command that specifies a clear value for use during execution of subsequent clear commands. The clear value may be a color or z value.

In step 501 clear index unit 456 determines if the clear value specified by the clear value command matches a current clear value that is stored in a register. In addition to storing a current clear value, a second register stores a current clear index that specifies an entry in the clear values table when the current clear index is valid. The current clear index is initialized as invalid, e.g., 0x0. When the current clear index is valid, the index corresponds to an entry in the clear values table that stores the current clear value. When zero-bandwidth-clears are enabled and the current clear index is valid, the current clear index is output with subsequent clear commands.

In step 501, when clear index unit 456 determines that the clear value received as part of the clear value command does not match the current clear value, clear index unit 456 proceeds to step 505 and determines if any valid entries in the clear values table match the clear value. Each entry storing a color clear value may store 128 bits. Each entry storing a z clear value may store 32 bits of z and 8 bits of stencil. Each entry may also include a valid bit that indicates whether or not a clear value stored in the entry is valid. In some embodiments of the present invention, a separate clear values table or separate entries in a single clear values table are used to store stencil clear values.

If, in step 505 no entries in the clear values table match the clear value in the command, then in step 507 the current clear index value is invalidated and in step 508 the clear value in the command is stored in the register as the current clear value. If, in step 505, an entry in the clear values table does match the clear value in the command, then in step 506 clear index unit 456 updates the current clear index to the index of the entry that stores the matching clear value and in step 508 the clear value in the command is stored in the register as the current clear value. If, in step 501 clear index unit 456 determines that the clear value specified by the clear value command matches the current clear value, then in step 503, the current clear value and current clear index are retained in the registers.

In some embodiments of the present invention, the clear values table in clear index unit 456 stores clear values in a format that may differ from the format of the color and/or z buffer. Clear values of different formats that map to the same bit pattern in the color and/or z buffer can share the same table entry (and corresponding index) and are considered to match in step 505. For example, the four channel color clear value of (0.0, 0.0, 0.0, 0.0) maps to the bit pattern 0x00000000 . . . in one or more color formats. Similarly, the four channel color clear value of (1.0, 1.0, 1.0, 1.0) maps to the bit pattern 0xFFFFFFFF . . . in one or more color formats. When fewer than four channels are used, only the used channels need to match. The clear values table in clear index unit 456 may also store a format indicator in each entry that specifies which clear value formats are compatible with other formats used in the color and/or z buffer.

Figure 5B:
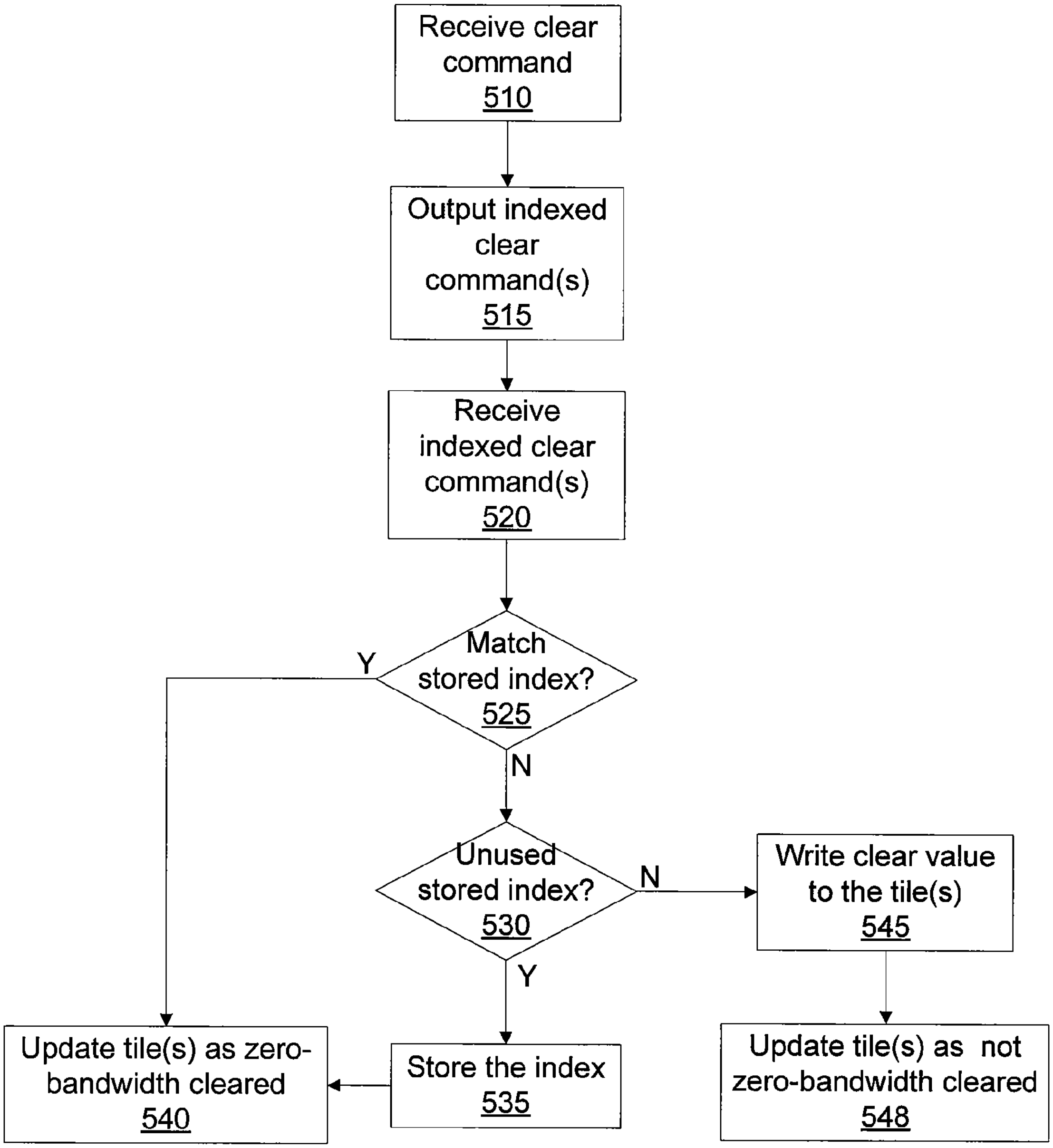
FIG. 5B is a flow diagram of method steps for performing index-based zero-bandwidth-clear operations, according to one embodiment of the present invention.

FIG. 5B is a flow diagram of method steps for performing index-based zero-bandwidth-clear operations, according to one embodiment of the present invention. For purposes of describing the present invention, zero-bandwidth-clears are assumed to be enabled. Zero-bandwidth-clears may be enabled or disabled for one or more application programs or for specific buffers. In step 510 clear index unit 456 receives an input clear command that specifies a region of graphics data, e.g., color, z, or stencil, that will be cleared to the current clear value when the clear command is executed. The region may include one or more pixels of graphics data. In step 515 clear index unit 456 outputs one or more indexed clear commands, where each one of the indexed clear commands specifies a tile set that is included in the region and a clear index value.

A tile set may correspond to a memory page, portion of a memory page, or other portion of memory that includes graphics data for one or more pixels. One or more tile sets may be fully or partially covered by a region. Each tile set may include one or more tiles of a buffer and is not necessarily rectangular. In some embodiments of the present invention a tile set includes four tiles and a tile group includes multiple tile sets, such as a collection of tile sets that reside in the same partition unit 215. The indexed clear commands output in step 515 may include a flag to differentiate between whether or not an index field of the indexed clear command is valid. Alternately, an index value of 0x0 may be used to indicate that the index is not valid. The indexed clear commands include the current clear value, and are output by clear index unit 456 for each fully covered tile set within the region. When the indexed clear command index is invalid, the indexed clear command is executed using conventional write requests to store the current clear value in external memory.

After flowing through the graphics pipeline, the indexed clear commands reach one or more partition units 215 associated with the region of graphics data. In step 520 the partition units 215 receive the indexed clear commands and each partition unit 215 determines if the clear index specified by the indexed clear command matches a stored clear index for the tile group. In one embodiment of the present invention, a single clear index is stored for a tile group that may include multiple tile sets. In other embodiments, a single index may be stored for each tile set or a clear index may be stored for each smaller portion of a tile set or single tile. If the indexed clear command index matches the stored index for the tiles in the tile set, then in step 540 tile group state is updated to indicate that the tiles in the tile set are zero-bandwidth cleared. In addition to storing a zero-bandwidth-clear flag for each tile, the tile group state may also store format information. When the zero-bandwidth-clear flag for a tile is asserted, the tile is considered to be cleared to the clear value in the entry of the clear values table that corresponds to the stored index for the tile group.

If, in step 525 the partition unit 215 determines that the clear index specified by the indexed clear command does not match the stored index, then in step 530 the partition unit 215 determines if the stored index is unused. The stored index is considered unused when it is invalid. In some embodiments of the present invention, the stored index may also be considered unused when none of the tiles in a tile group reference the stored index. The tile state indicates which tiles in each tile group are cleared to the clear value referenced by the stored index. Examination of the tile state for each tile in the group can be performed to determine if any of the tiles in the tile group are cleared.

If, in step 530 the partition unit 215 determines that the stored index is unused, then in step 535 the partition unit 215 stores the index specified by the indexed clear command for the tile group and proceeds to step 540. If, in step 530 the partition unit 215 determines that the stored index is used, then in step 545 the partition unit 215 writes the clear value specified by the indexed clear command to the tile, replicating the clear value as needed to fill the tile. In step 548 the partition unit 215 updates the tile state to indicate that the tile is not zero-bandwidth-cleared. Since different tiles in a region may be in different tile groups, some tiles in the region may match the stored index for their group in step 525 while other tiles do not. Similarly, some tiles may be in a tile group that has an unused stored index, while others are in tile groups that do not have an unused stored index. Therefore, different tiles in a region may be processed following different paths through the method shown in FIG. 5B. Note that steps 525, 530, 535, 540, 545, and 548 may be completed by partition units 215 serially or in parallel for each indexed clear command produced in step 515.

Figure 5C:
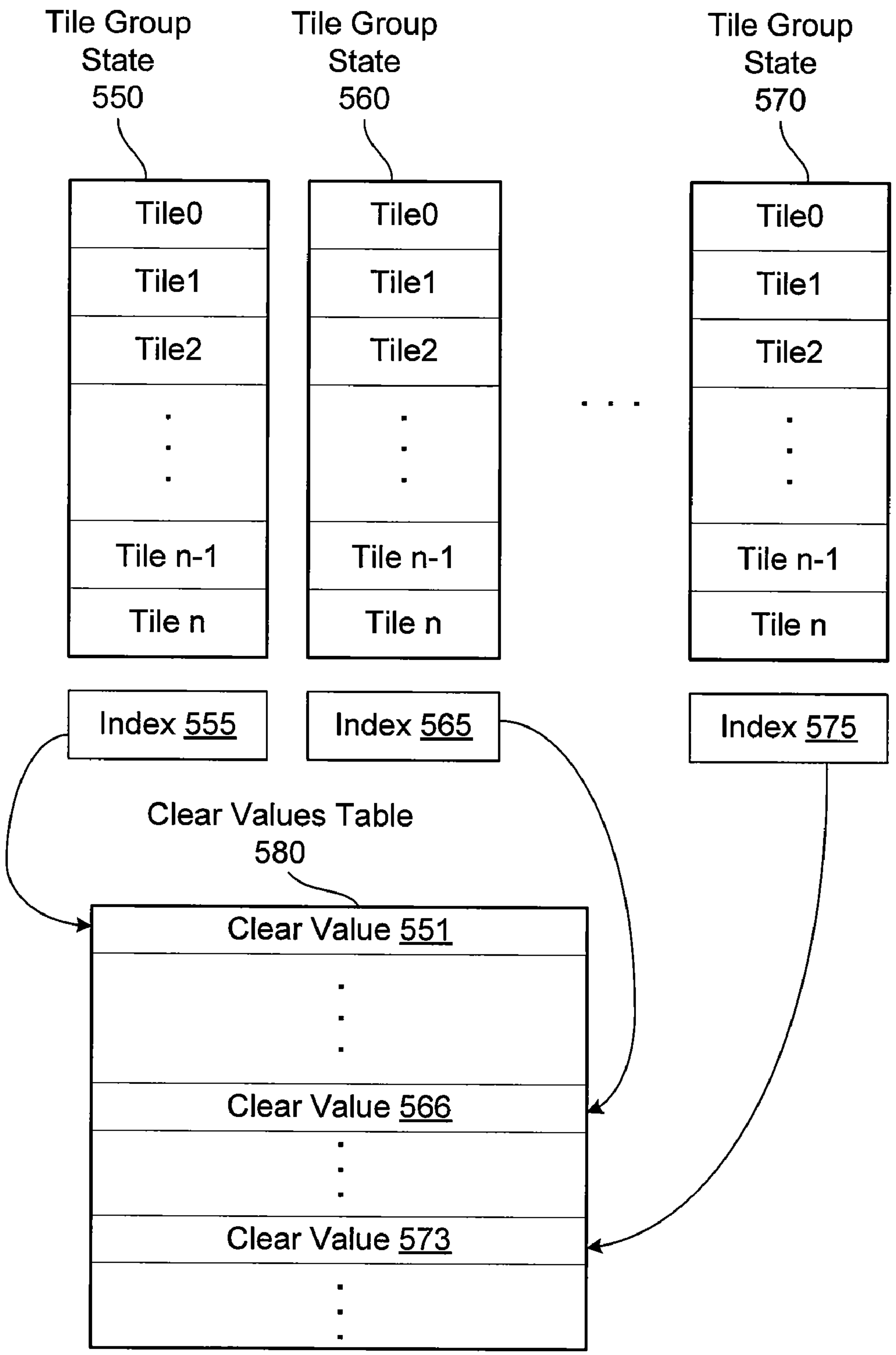
FIG. 5C is a conceptual diagram illustrating the interactions between clear indices and the clear values table, according to one embodiment of the present invention.

FIG. 5C is a conceptual diagram illustrating the interactions between clear indices and the clear values table 580, according to one embodiment of the present invention. State information is stored for each tile in a tile group, as shown by tile group states 550, 560, and 570 that each include state information for n tiles, where n is an integer. In some embodiments of the present invention, in addition to indicating whether or not a tile is cleared to the clear value specified by the stored index, the tile group state information indicates whether the tile is represented in a compressed state. In some embodiments of the present invention, the tile group state information also indicates the compression type of compression or packing of the data stored in the tile, e.g., compressed integer or floating-point data, whether alpha components are interleaved with color components in the tile or stored separately, etc.

A clear index, e.g., index 555, 565, and 575, is stored for each tile group. The clear index points to an entry of clear values table 580 that stores a clear value. A clear index may also have an invalid value that does not point to an entry of clear values table 580. As shown in FIG. 5C, index 555 points to the entry of clear values table 580 storing clear value 551, index 565 points to the entry of clear values table 580 storing clear value 566, and index 575 points to the entry of clear values table 580 storing clear value 573. More than one index may point to the same entry in clear values table 580.

Figure 6A:
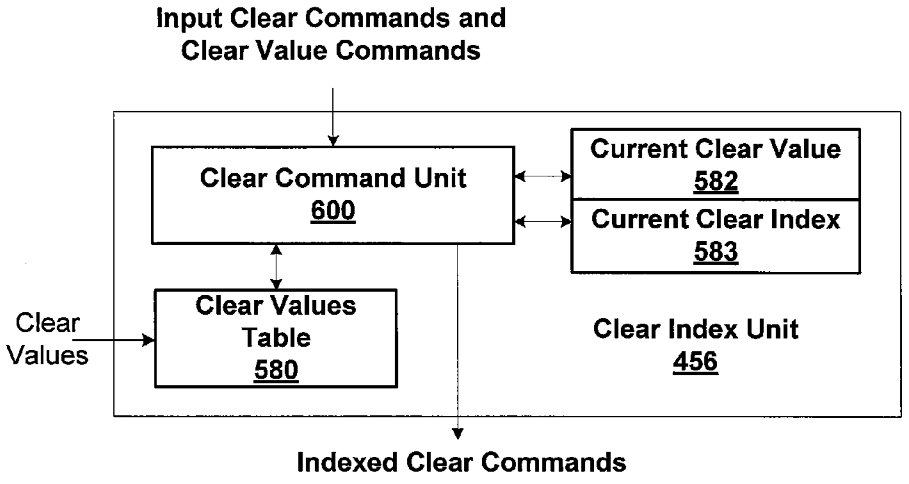
FIGS. 6A and 6B are block diagrams of portions of a PPU configured to perform index-based zero-bandwidth-clear operations, according to one embodiment of the present invention.

FIG. 6A illustrates a portion of PPU 202 that is configured to perform zero-bandwidth-clear operations for index-based clear commands, according to one embodiment of the present invention. As previously described in conjunction with FIGS. 5A and 5B, clear index unit 456 may be configured to output indexed clear commands when zero-bandwidth-clears are enabled. A clear command unit 600 receives the input clear commands and clear value commands. Clear command unit 600 performs the steps shown in FIG. 5A and steps 510 and 515 shown in FIG. 5B. A current clear value 582 stores a clear value received as part of a clear value command and is read and written by clear command unit 600. A current clear index 583 either stores an index of an entry in clear values table 580 or is invalid, and is read and written by clear command unit 600.

Clear values table 580 stores clear values that are loaded using register writes that bypass the graphics processing pipeline, or may be loaded by commands within a rendering command stream. Register writes may be performed by a resource manager or device driver 103. The clear values that are stored in clear values table 580 may be the same or may differ for each application program. In some embodiments of the present invention, the clear values are loaded into clear values table 580 when the clear value commands are received. Once the clear values table 580 is full, no more clear values received with the clear value command are stored in clear values table 580. The clear value commands are used to load the clear values table 580 in clear index unit 456 and in each partition unit 615.

Figure 6B:
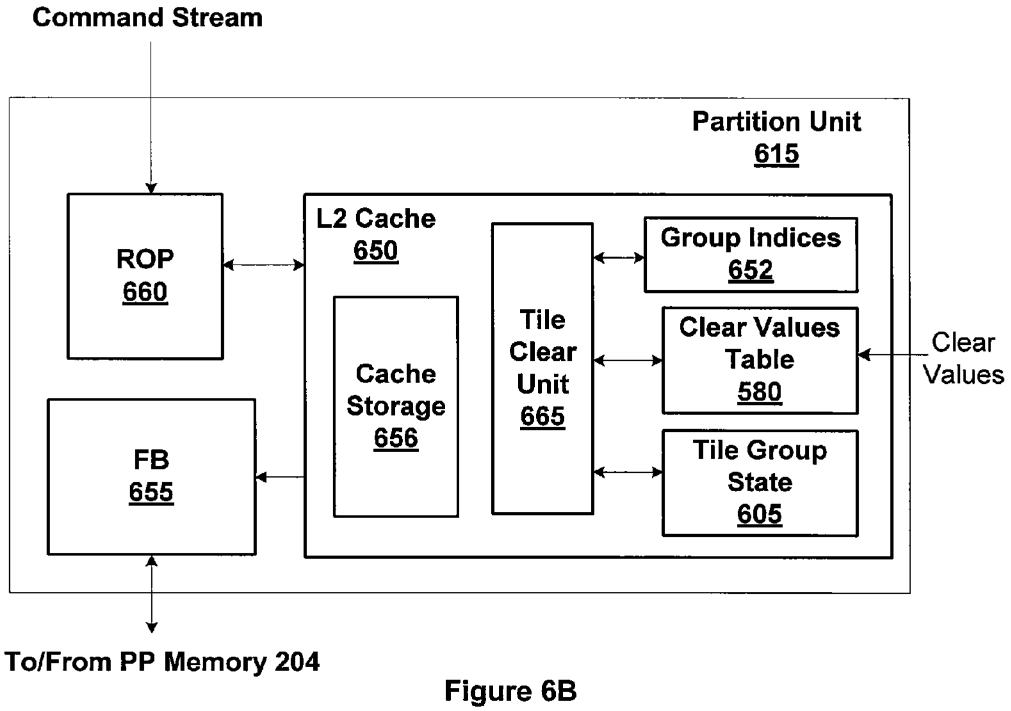

FIG. 6B illustrates another portion of PPU 202 that is configured to perform zero-bandwidth-clears for index-based clear operations, according to one embodiment of the present invention. In addition to performing the functions of previously described partition unit 215, a ROP 660 within partition unit 615 receives a command stream that includes indexed clear commands, and performs zero-bandwidth-clear operations. A tile clear unit 665, tile group state 605, and clear values table 580 are included within an L2 cache 650. L2 cache 650 performs the functions of L2 cache 350 by storing data in a cache storage 656. Tile clear unit 665 performs steps 520, 525, 530, 535, 540, 545, and 548 of FIG. 5B. When the index received with an indexed clear command is invalid, tile clear unit 665 determines the format of the tile according to tile group state 605. The clear value received with the indexed clear command is converted as needed to match the format of the tiles and replicated as necessary to write the tiles in the tile set. The converted and replicated clear values are written to PP memory 204 by FB 655. In addition to performing the functions of ROP 360, ROP 660 receives rendering and indexed clear commands and interacts with L2 cache 350 for processing the tile clear commands and memory access requests.

When the index received with the indexed clear command is valid and matches the index stored in group indices 652, tile clear unit 665 updates tile group state 605 to indicate that the tiles in the tile set are zero-bandwidth-cleared. When the index received with the indexed clear command is valid and does not match the index stored in group indices 652, tile clear unit 665 determines if the stored index is invalid or unused. The stored index is unused if none of the tiles in the group are zero-bandwidth-cleared, according to tile group state 605.

Tile clear unit 665 writes the index received with the indexed clear command to group indices 652 when the stored index is invalid or unused, and then updates tile group state 605 to indicate that the tiles in the tile set are zero-bandwidth-cleared. As previously described, when the stored index is used and does not match the index received with the indexed clear command, the data in the tiles are explicitly cleared by writing the corresponding clear value to the tiles.

In some embodiments of the present invention, a command may be used to invalidate the indices stored in group indices 652 and update all of the tiles to indicate that they are not zero-bandwidth-cleared, in order to perform a fast clear of the tile groups. The next valid index that is received with an indexed clear command will be stored in group indices 652 and all tiles in the tile groups may then be cleared to that value using zero-bandwidth-clear operations or cleared by writing tile group state 605 to indicate that the tiles in the tile groups are cleared. Tile group state 605 can also be written to indicate that one or more tiles are zero-bandwidth-cleared to a value corresponding to an index stored in group indices 652.

Figure 6C:
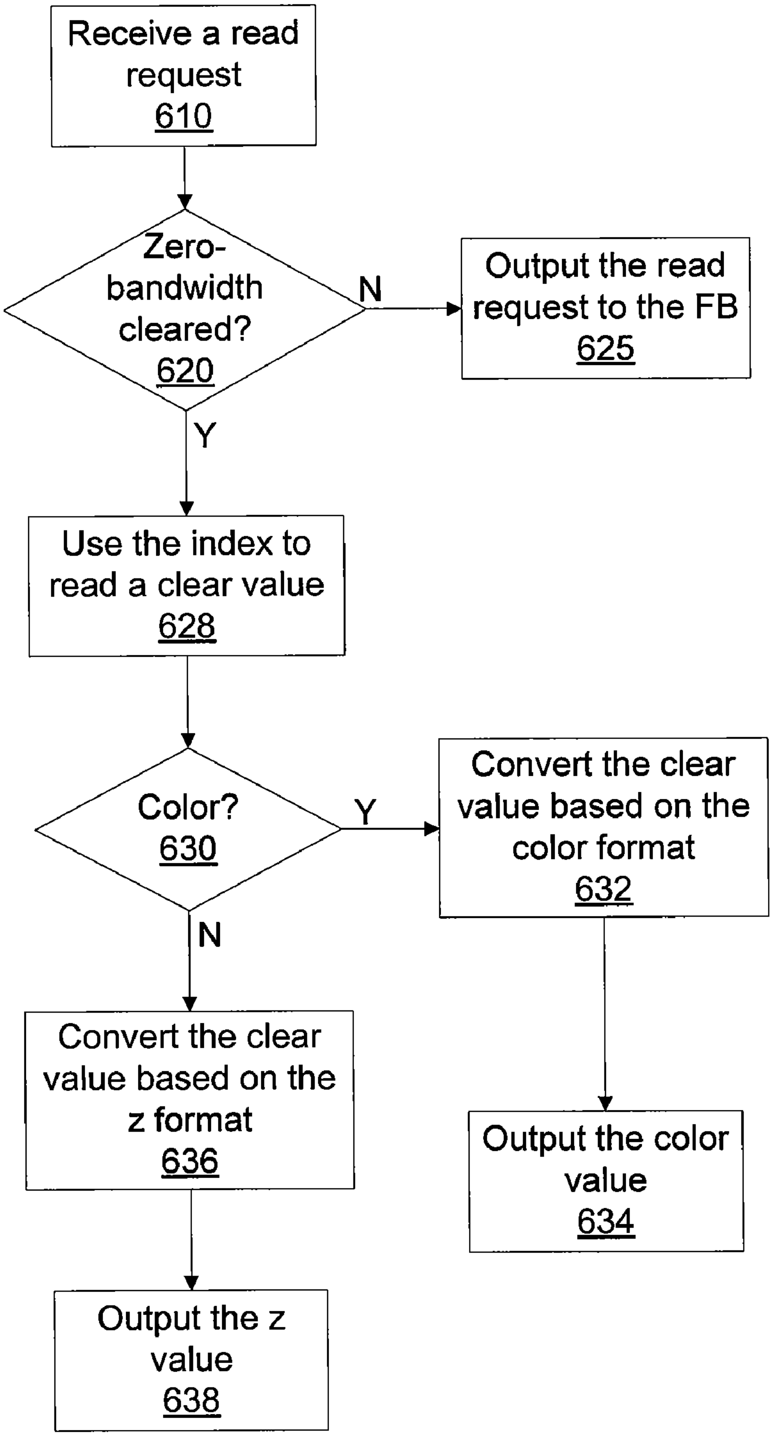
FIG. 6C is a flow diagram of method steps for reading data stored using index-based zero-bandwidth-clear commands, according to one embodiment of the present invention.

In addition to reducing the memory bandwidth needed to clear graphics data stored in external and internal memory, zero-bandwidth clears also eliminate the bandwidth required to read cleared data during subsequent rendering. FIG. 6C is a flow diagram of method steps for reading data stored using index-based clear commands, according to one embodiment of the present invention. In step 610 partition unit 615 receives a read request. In step 620 tile clear unit 665 determines if the tile is zero-bandwidth-cleared to the clear value corresponding to the index stored in group indices 652 by accessing the tile state stored in tile group state 605. Note that in some embodiments of the present invention, tile clear unit 665 determines that the tile is not zero-bandwidth-cleared when the index stored in group indices 652 is invalid.

When tile clear unit 665 determines that the tile is not zero-bandwidth-cleared, then in step 625 the read request is output to FB 655. Otherwise, in step 628 the stored index is used to read a clear value for the tile from the corresponding entry in clear values table 580. In step 630 tile clear unit 665 determines if the tile stores color data, and, if so, in step 632 the clear value for the tile is converted based on the color format specified for the tile to produce a color value. The color format may be received with the read request or may be stored in tile group state 605. In step 634 the color value is replicated as needed and output to satisfy the read request.

If, in step 630 tile clear unit 665 determines that the tile does not store color data, then in step 636 the clear value for the tile set is converted based on the z format specified for the tile set to produce a z value. The z format may be received with the read request or may be stored in tile group state 605. In step 638 the z value is replicated as needed and output to satisfy the read request. In some embodiments of the present invention, the clear value is stored in the format specified for the tile and steps 632 and 636 are omitted.

Figure 6D:
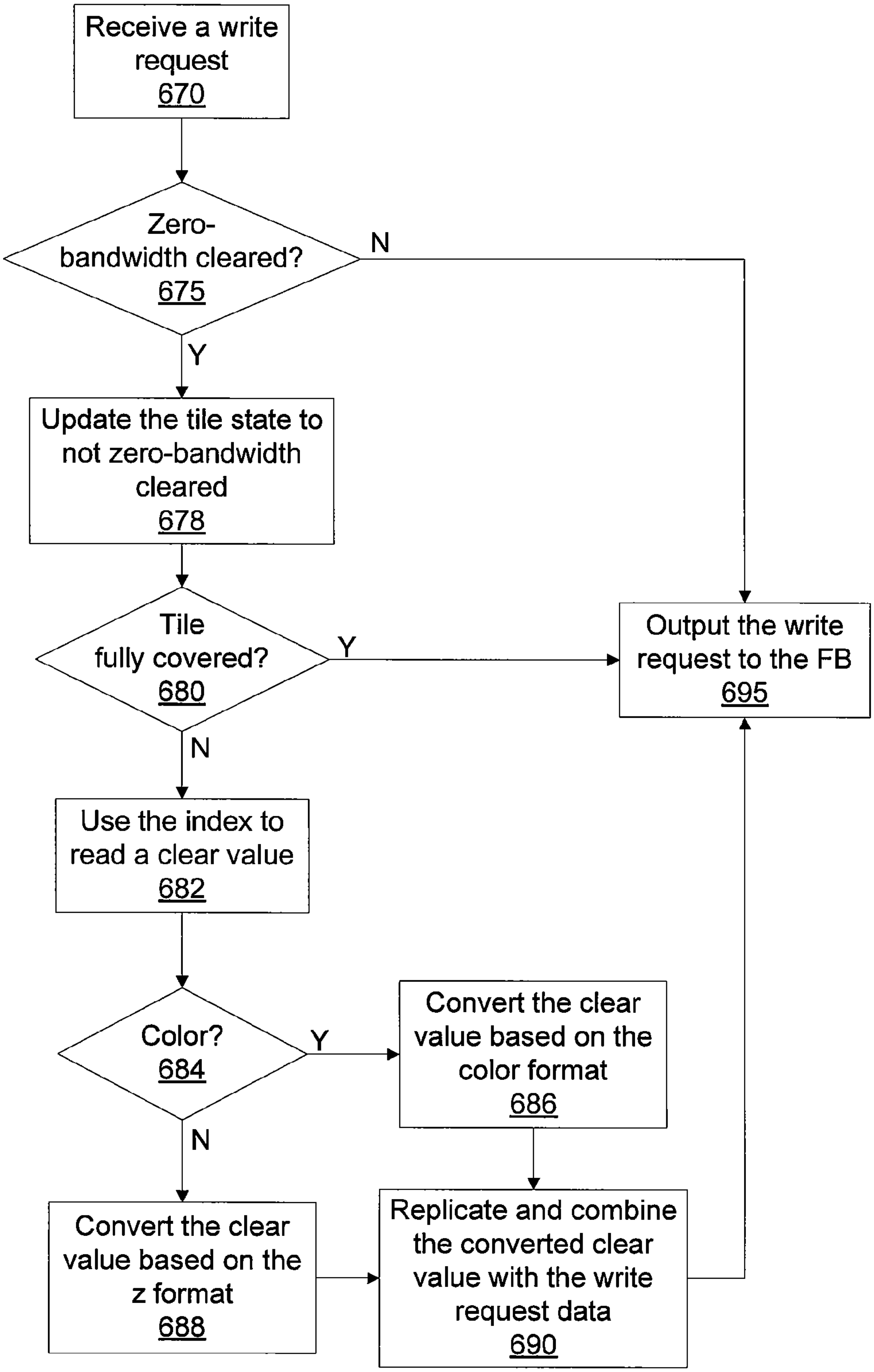
FIG. 6D is a flow diagram of method steps for writing data stored using index-based zero-bandwidth-clear commands, according to one embodiment of the present invention.

FIG. 6D is a flow diagram of method steps for writing data to a tile that has been zero-bandwidth cleared, according to one embodiment of the present invention. In step 670 partition unit 615 receives a write request. In step 675 tile clear unit 665 determines if the tile has been zero-bandwidth cleared. If the tile has not been zero-bandwidth cleared, then in step 695 the write request is output to FB 655. If the tile has been zero-bandwidth cleared, then in step 678 tile group state 605 is updated to indicate that the tile is no longer zero-bandwidth cleared before proceeding to step 695. In step 680, the write request is examined to see whether it fully covers the tile. If it does fully cover the tile, in step 695 the write request is output to FB 655. If the write request does not fully cover the tile, in step 682 the zero-bandwidth-clear data is retrieved from clear value table 580 according to the index stored in group indices 652, and converted based on the format specified for the tile to produce a clear value.

In step 684 tile clear unit 665 determines if the tile stores color data, and, if so, in step 686 the clear value for the tile is converted based on the color format specified for the tile to produce a color value. The color format may be received with the read request or may be stored in tile group state 605. If, in step 684 tile clear unit 665 determines that the tile does not store color data, then in step 688 the clear value for the tile set is converted based on the z format specified for the tile to produce a z value. The z format may be received with the read request or may be stored in tile group state 605. In some embodiments of the present invention, the clear value is stored in the format specified for the tile and steps 686 and 688 are omitted. In step 690 the converted clear value is replicated and combined with the original write request data, forming an expanded write request. In step 695, this expanded write request is output to FB 655.

Zero-Bandwidth-Clear Operations Using Stored Clear Values

In another embodiment of the present invention, zero-bandwidth-clear operations are performed without using clear values table 580. Instead a number of clear values are stored for each tile group. Storing two clear values allows for a first portion of the tiles in the tile group to be cleared to a different value than a second portion of the tiles. This is useful during frame transitions. Since the clear values used to perform zero-bandwidth-clears are not stored in a table, a wider variety of clear values may be used for the different tile groups. Rather than preloading clear values, the clear values for each tile group are stored as they are received and replaced by new clear values when they are no longer referenced by any tiles in the tile group.

Figure 7A:
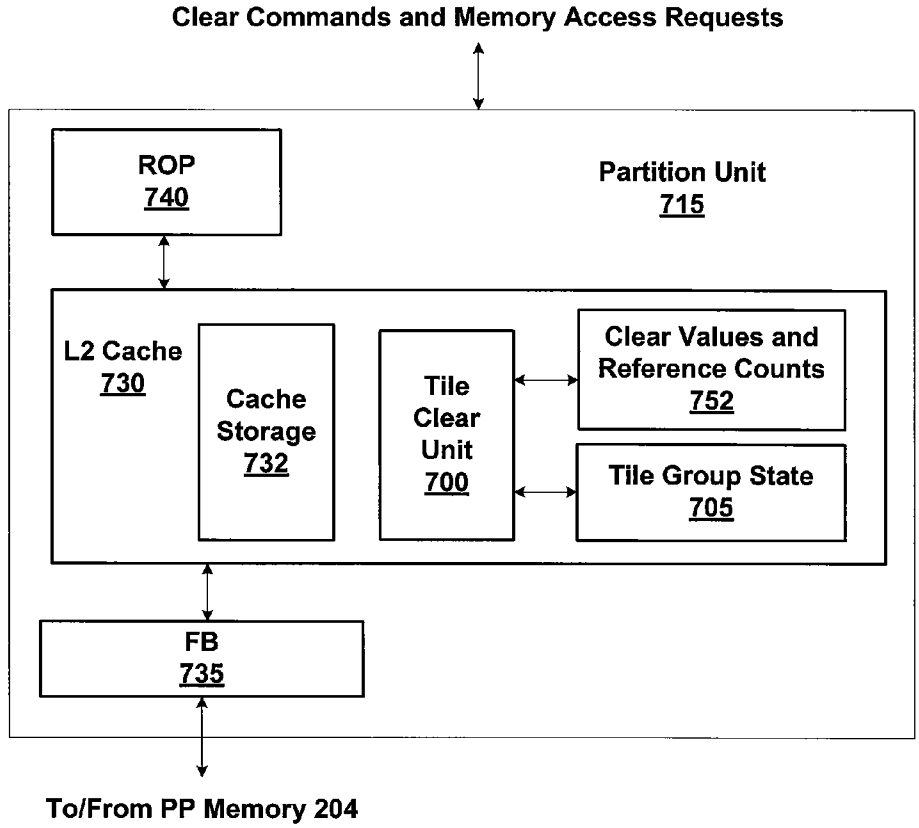
FIG. 7A is a block diagram of portions of a PPU configured to perform zero-bandwidth-clear operations, according to one embodiment of the present invention.

FIG. 7A is a block diagram of a partition unit 715 that is configured to perform zero-bandwidth-clear operations using stored clear values, according to one embodiment of the present invention. In addition to performing the functions of partition unit 215, partition unit 715 is configured to perform zero-bandwidth-clear operations. Similarly, an L2 cache 730, FB 735, and ROP 740 are configured to perform the functions of previously described L2 cache 350, FB 355, and ROP 360, respectively. L2 cache 350 also includes a cache storage 732 to store data and a tile clear unit 700, clear values and reference counts 750, and a tile group state 705 to perform zero-bandwidth-clear operations.

ROP 740 receives input clear commands and memory access requests from crossbar unit 210. Input clear commands are input by L2 cache 730 to a tile clear unit 700. Tile clear unit 700 stores clear values for each tile group and a reference count for each stored clear value in clear values and reference counts 752. In some embodiments of the present invention, two clear values and corresponding reference counts are stored for each tile group. In other embodiments of the present invention more than two clear values and corresponding reference counts are stored for each tile group. When a reference count for a tile group equals zero, a new clear value may be stored in clear values and reference counts 752 for the tile group. A tile group state 705 stores state information for the tile group, such as compression and data formats used to represent each tile in a tile group, including a flag that indicates if a tile is zero-bandwidth-cleared to a stored clear value and an index referencing one of the stored clear values. In some embodiments of the present invention, one or more of the tile state, clear values, and reference counts may be written using a command to quickly clear all of the tiles to a value without issuing clear commands for each tile or tile set. In other embodiments of the present invention the reference counts may be omitted and tile clear unit 700 may be configured to check that no tile in the tile group is in a zero-bandwidth clear state and references a particular index. This requires more detailed examination of tile group state 705 while simplifying the updating operation.

Figure 7B:
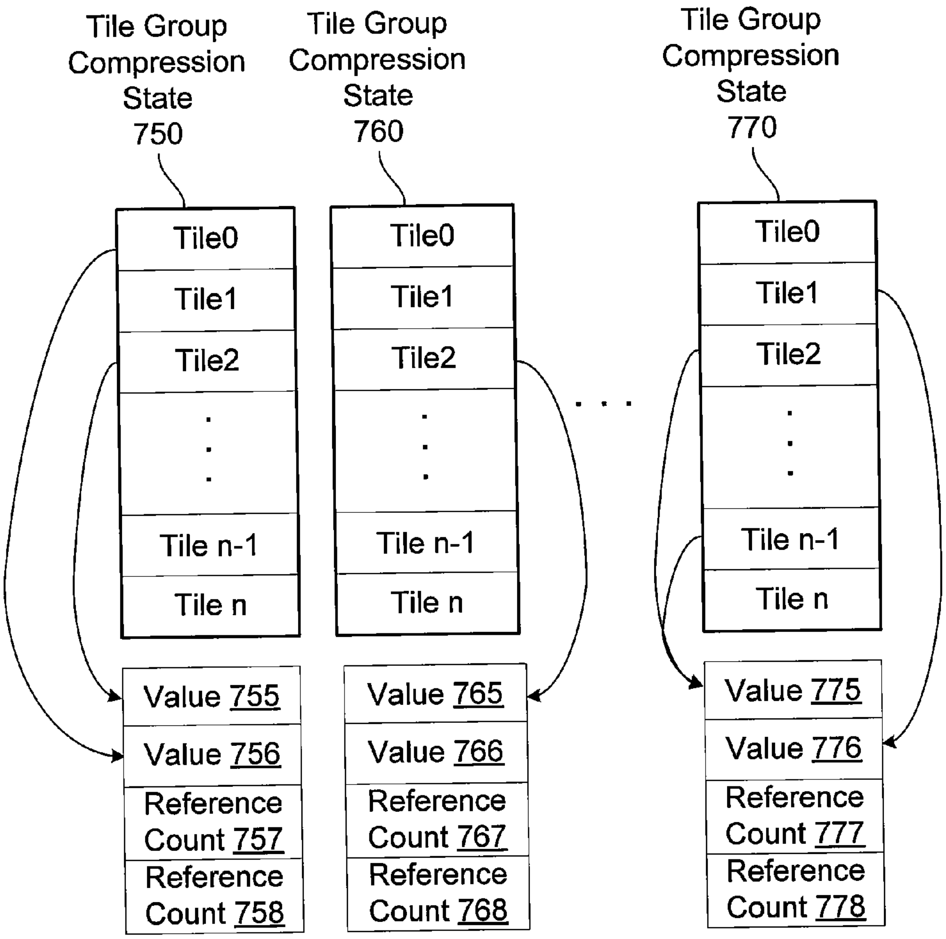
FIG. 7B is a conceptual diagram illustrating the interactions between tile group state and stored clear values, according to one embodiment of the present invention.

FIG. 7B is a conceptual diagram illustrating the interactions between tile group state and stored clear values, according to one embodiment of the present invention. Tile group compression states 750, 760, and 770 are stored in tile group state 705. Each tile within a tile group, e.g., tile 0, tile 1, . . . tile n, whose zero-bandwidth-clear flag is set stores an index to one of the clear values stored in clear values and reference counts 752 for the tile group. For example, tile 0 of tile group compression state 750 is cleared and points to (clear) value 756. Tile 2 of tile group compression state 750 is cleared and points to (clear) value 755. Tile 2 of tile group compression state 760 is cleared and points to (clear) value 765. Tile 1 of tile group compression state 770 is cleared and points to (clear) value 776. Tile 2 and tile set(n−1) of tile group compression state 770 are cleared and both reference (clear) value 775. Reference count 757 indicates the number of tiles that point to (clear) value 755. Similarly, reference counts 758, 767, 768, 777, and 778 indicate the number of tiles that point to (clear) values 756, 765, 766, 775, and 776, respectively.

Figure 8A:
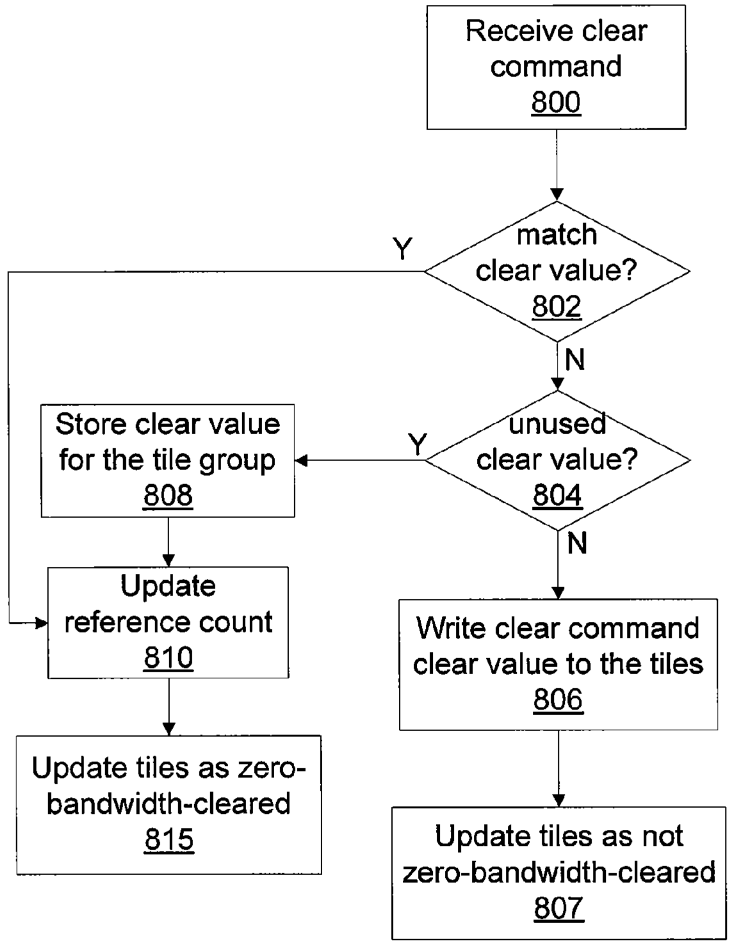
FIG. 8A is a flow diagram of method steps executing a zero-bandwidth-clear command, according to one embodiment of the present invention.

FIG. 8A is a flow diagram of method steps performing zero-bandwidth-clear operations using stored clear values, according to one embodiment of the present invention. In step 800 a clear command is received by a partition unit 715. The clear command is produced by clear index unit 456 for each fully covered tile set within a region. The clear command includes a clear value and indicates a tile set that will be cleared. In other embodiments of the present invention the clear command may be configured to clear single tiles. In step 802 tile clear unit 700 determines if the clear value received with the command matches a stored clear value for the tile group that includes one or more tile sets. If, the clear value matches, then tile clear unit 700 proceeds directly to step 810. Otherwise, in step 804 tile clear unit 700 determines if at least one of the stored clear values for the tile group including the tile set is unused, i.e., has a reference count of zero. If all of the clear values for the tile group are used, then in step 806 tile clear unit 700 writes the clear value to the tiles in the tile set using conventional techniques. In step 807 tile clear unit 700 updates the tile state for the tiles in the tile set as not zero-bandwidth-cleared and updates, i.e., decrements, a (tile group) reference count for each tile in the tile set that was zero-bandwidth-cleared to one of the stored clear values.

If, in step 804 tile clear unit 700 determines that at least one of the stored clear values for the tile group including the tile set is unused, then in step 808 tile clear unit 700 stores the clear value received with the command in an unused clear value register in clear values and reference counts 752. In step 810 tile clear unit 700 updates, i.e., increments, the reference count corresponding to the stored clear value in clear values and reference counts 752 for each tile in the tile set. Tile clear unit 700 also updates, i.e., decrements, another reference count for each tile in the tile set whose tile state indicated that the tile was zero-bandwidth-cleared to a different one of the stored clear values. In step 815 tile clear unit 700 sets the zero-bandwidth-clear flag in tile group state 705 for the tiles in the tile set.

Figure 8B:
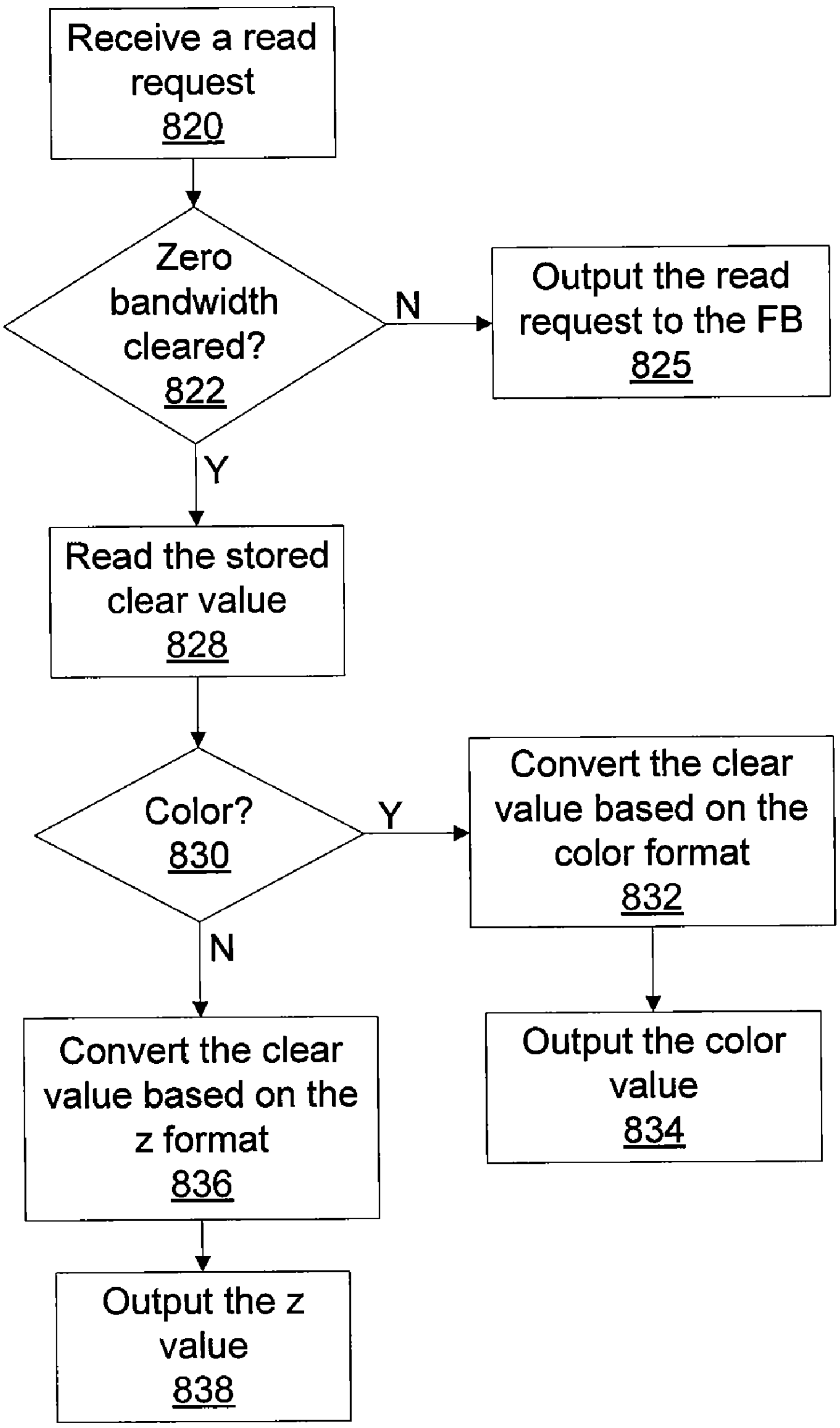
FIG. 8B is a flow diagram of method steps for reading data stored using zero-bandwidth-clear commands, according to one embodiment of the present invention.

FIG. 8B is a flow diagram of method steps for reading data stored using clear commands, according to one embodiment of the present invention. In addition to reducing the memory bandwidth needed to clear graphics data stored in internal memory, e.g., L2 cache 730, or external memory, e.g., system memory 104 or PP memory 104, the memory bandwidth needed to read cleared graphics data is reduced. Additionally, the hit rate of L2 cache 730 may be improved since the zero-bandwidth-cleared data is not stored in cache storage 732.

In step 820 partition unit 715 receives a read request. In step 822 tile clear unit 700 determines if the tile is cleared to a stored clear value for the tile group including the tile. Tile clear unit 700 reads the zero-bandwidth-clear flag for the tile that is stored in tile group state 705, to determine whether or not the tile is zero-bandwidth-cleared. If the tile is not cleared, according to the zero-bandwidth-clear flag, then in step 825 tile clear unit 700 outputs the read request to FB 735 via L2 cache 730. The read request is then processed in a conventional manner.

If, in step 822 tile clear unit 700 determines that the tile is cleared, then in step 828 tile clear unit 700 obtains the index stored in tile group state 705 for the tile. The pointer is used to read one of the clear values. When only one clear value is stored for each tile group, an index is not needed. In step 830 tile clear unit 700 determines if the tile stores color data, and, if so, in step 832 the clear value for the tile is converted based on the color format specified for the tile to produce a color value. The color format may be received with the read request or may be stored in tile group state 705. In step 834 the color value is replicated as needed and output to satisfy the read request.

If, in step 830 tile clear unit 700 determines that the tile does not store color data, then in step 836 the clear value for the tile is converted based on the z format specified for the tile to produce a z value. The z format may be received with the read request or may be stored in tile group state 705. In step 838 the z value is replicated as needed and output to satisfy the read request.

Figure 8C:
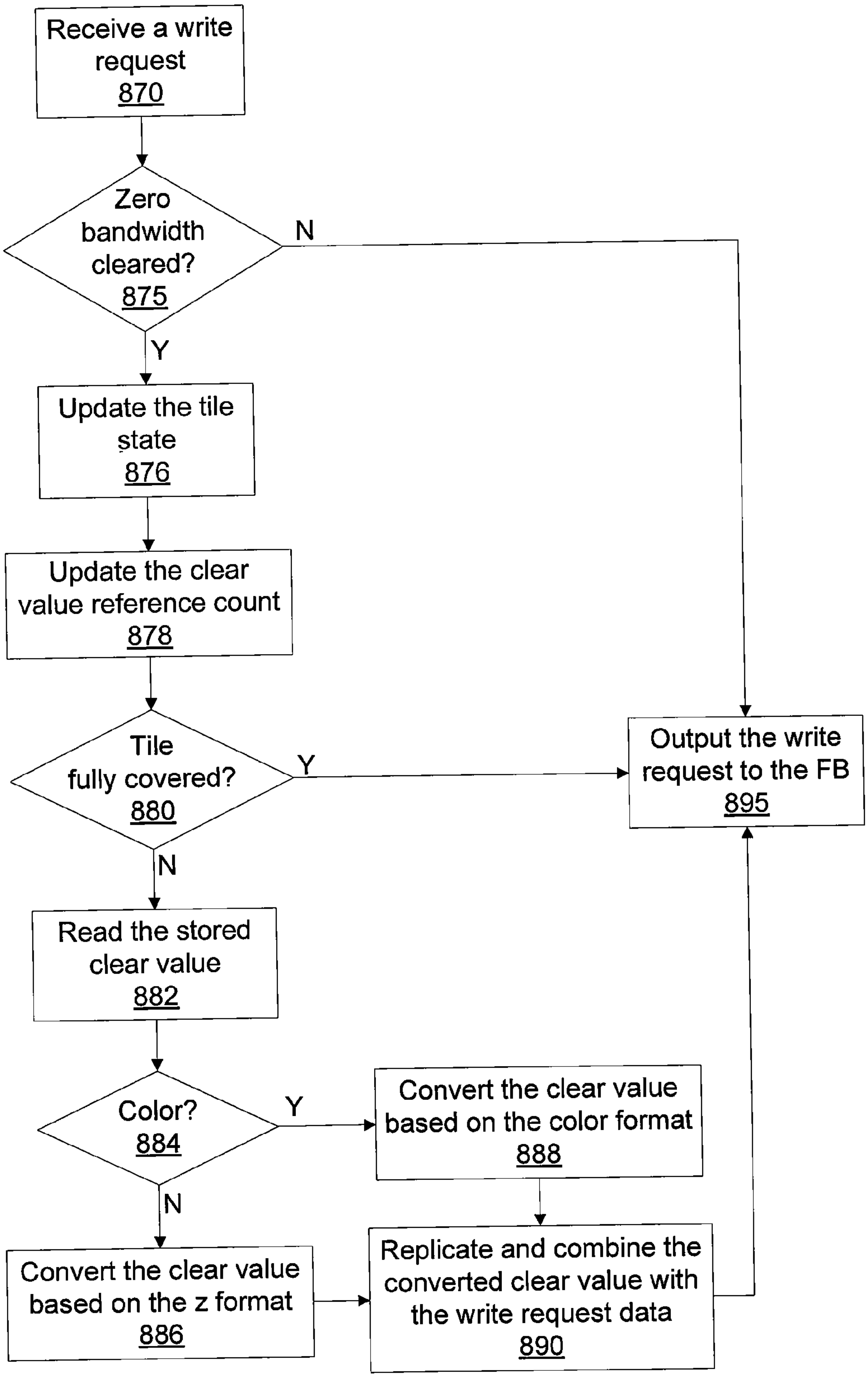
FIG. 8C is a flow diagram of method steps for writing data stored using zero-bandwidth-clear commands, according to one embodiment of the present invention.

FIG. 8C is a flow diagram of method steps for writing data stored using clear commands, according to one embodiment of the present invention. In step 870 partition unit 715 receives a write request. In step 875 tile clear unit 700 determines if the tile is zero-bandwidth-cleared to a stored clear value stored for the tile group that includes the tile. Tile clear unit 700 reads the zero-bandwidth-clear flag that is stored in tile group state 705 for the tile set to determine whether or not the tile is cleared. If the tile is not zero-bandwidth-cleared, according to the zero-bandwidth-clear flag, then in step 895 tile clear unit 700 outputs the write request to FB 735 via L2 cache 730. The write request is then processed in a conventional manner.

If, in step 875 tile clear unit 700 determines that the tile is zero-bandwidth-cleared to a clear value stored for the tile group including the tile, then in step 876 tile clear unit 700 updates the tile group state, e.g., clears the zero-bandwidth-clear flag, for the tile to indicate that the tile is no longer zero-bandwidth-cleared to one of the stored clear values. In step 878 tile clear unit 700 updates, i.e., decrements, the reference count corresponding to the stored clear value in clear values and reference counts 752.

In step 895, the write request is examined to see whether it fully covers the tile. If it does fully cover the tile, in step 895 the write request is output to FB 735. If the write request does not fully cover the tile, in step 882 the zero-bandwidth-clear data is retrieved from clear values and reference counts 752 according to the index stored in tile group state 705, and converted based on the format specified for the tile to produce a clear value.

In step 884 tile clear unit 700 determines if the tile stores color data, and, if so, in step 886 the clear value for the tile is converted based on the color format specified for the tile to produce a color value. The color format may be received with the read request or may be stored in tile group state 705. If, in step 884 tile clear unit 700 determines that the tile does not store color data, then in step 888 the clear value for the tile is converted based on the z format specified for the tile to produce a z value. The z format may be received with the read request or may be stored in tile group state 705. In step 890 the converted clear value is replicated and combined with the original write request data, forming an expanded write request. In step 895 tile clear unit 700 outputs the write request to FB 735 via L2 cache 730. The write request is then processed in a conventional manner.

Systems and methods for performing zero-bandwidth-clear operations can accelerate clears and reduce internal and external memory accesses by PPU 202 and improve cache hit rates. A set of clear values are stored in a common clear value table or in per-tile block registers. Each region of a color or z buffer may be configured when zero-bandwidth-clears are enabled to reference a stored clear value without writing the external or internal memory. The clear value is provided to a requestor without accessing the external or internal memory when a read access is performed. Therefore accesses to external and internal memory may be reduced.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for performing data clear operations, the method comprising:

receiving a clear command including a first clear value associated with a color buffer or a z buffer for a first tile set within a tile group;

determining that a first stored clear value for the tile group is not referenced by any tiles within the tile group;

storing the first clear value as the first stored clear value for the tile group; and updating state information for tiles in the first tile set to reference the first stored clear value, indicating that uncovered pixels within the tiles in the first tile set are zero-bandwidth cleared to the first stored clear value.

2. The method of claim 1, further comprising, prior to the step of determining that the first stored clear value for the tile group is not referenced by any tiles within the tile group, determining that the first clear value does not match a second stored clear value for the tile group and that the second stored clear value is referenced by at least one tile within the tile group.

3. The method of claim 1, further comprising:

receiving a clear command including a clear value for a second tile set within the tile group;

determining that the clear value matches the first stored clear value for the tile group; and updating state information for tiles in the second tile set to reference the first stored clear value, indicating that the tiles in the second tile set are cleared to the first stored clear value.

4. The method of claim 1, further comprising updating a reference count for the first stored clear value to indicate that the tiles in the first tile set are cleared to the first stored clear value.

5. The method of claim 4, further comprising:

receiving a write request including write data for a location in a first tile in the first tile set; and updating the reference count for the first stored clear value to indicate that the first tile is not cleared to the first stored clear value.

6. The method of claim 1, further comprising:

receiving a clear command including a clear value for a second tile set within the tile group;

determining that the clear value does not match the first stored clear value for the tile group;

updating state information for tiles in the second tile set to indicate that the tiles in the second tile set are not zero-bandwidth-cleared; and writing the clear value to a buffer storing the second tile set to clear the tiles in the second tile set to the clear value.

7. The method of claim 1, further comprising:

receiving a write request including write data for a location in a first tile in the first tile set; and updating the state information for the first tile to indicate that the first tile is not zero-bandwidth-cleared to the first stored clear value.

8. The method of claim 1, further comprising:

receiving a read request for a location in a first tile in the first tile set; and outputting the first stored clear value without accessing a buffer that stores the first tile.

9. The method of claim 1, further comprising:

receiving a read request for a first tile in the first tile set;

determining that the first tile stores color data;

converting the first stored clear value to a format specified for the color data to produce a converted first clear value; and outputting the converted first clear value without accessing a buffer that stores the first tile.

10. A method for performing data clear operations, the method comprising:

receiving a clear command including a first clear value for a first tile set within a tile group;

determining that the first clear value does not match a second stored clear value based on a bit pattern and independent of a color or depth data format;

determining that the second stored clear value is referenced by at least one tile within the tile group;

determining that a first stored clear value for the tile group is not referenced by any tiles within the tile group;

storing the first clear value as the first stored clear value for the tile group; and updating state information for tiles in the first tile set to reference the first stored clear value, indicating that the tiles in the first tile set are zero-bandwidth cleared to the first stored clear value.

11. A system for performing data clear operations, the system comprising:

a first register configured to store a first clear value associated with a color buffer or a z buffer for a tile group including multiple tile sets;

tile group state configured to store tile state information for each tile in each one of the tile sets in the tile group, the tile state information indicating whether or not each tile is zero-bandwidth-cleared; and a tile clear unit coupled to the first register and the tile group state, and configured to:

receive a clear command including a clear value for a fully covered tile set;

retain the first clear value in the first register when the clear value matches the first clear value; and update the tile group state for tiles in the tile set to indicate that uncovered pixels within the tiles are zero-bandwidth-cleared to the first clear value.

12. The system of claim 11, further comprising a second register configured to store a second clear value for the tile group.

13. The system of claim 12, wherein the tile clear unit is further configured to compare the clear value to the second clear value.

14. The system of claim 13, wherein the tile clear unit is further configured to output a write request to an external memory to clear the tiles in the tile set to the clear value when the clear value does not match the first clear value, the clear value does not match the second clear value, the tile state information indicates that at least one tile in the tile group is zero-bandwidth cleared to the first clear value and at least one tile in the tile group is zero-bandwidth cleared to the second clear value.

15. The system of claim 11, wherein the tile clear unit comprises:

a second register configured to store a first reference count indicating the number of tiles in the tile group that are cleared to the first clear value; and tile clear unit is coupled to the second register and configured to update the first reference count when a tile in the tile group is cleared to the first clear value.

16. The system of claim 11, wherein the tile clear unit is further configured to store the clear value as the first clear value for the tile group when the tile state information indicates that no tiles in the tile group are zero-bandwidth-cleared to the first clear value.

17. The system of claim 11, wherein the tile clear unit is further configured to output the first clear value when a read request for a tile is received and the tile state information for the tile indicates that the tile is zero-bandwidth-cleared.

18. The system of claim 11, wherein the tile clear unit is further configured to:

convert the first clear value to a format specified for a tile in the tile set to produce a converted first clear value; and output the converted first clear value when a read request for the tile in the tile set is received and the tile state information indicates that the tile is zero-bandwidth-cleared.

19. The system of claim 11, wherein the tile clear unit is further configured to update the tile state information to indicate that a tile in the tile set is not zero-bandwidth-cleared when a write request for the tile is received and the tile state information indicates that the tile is zero-bandwidth-cleared.

20. A system for performing data clear operations, the system comprising:

a first register configured to store a first clear value for a tile group including multiple tile sets;

tile group state configured to store tile state information for each tile in each one of the tile sets in the tile group, the tile state information indicating whether or not each tile is zero-bandwidth-cleared; and a tile clear unit coupled to the first register and the tile group state, and configured to:

receive a clear command including a clear value for a fully covered tile set;

determine whether the first clear value matches the clear value based on a bit pattern that is independent of a color or depth data format;

retain the first clear value in the first register when the clear value matches the first clear value; and update the tile group state for tiles in the tile set to indicate that the tiles are zero-bandwidth-cleared to the first clear value.

* * * * *